US006889730B2

United States Patent
Shinoda et al.

(10) Patent No.: US 6,889,730 B2
(45) Date of Patent: May 10, 2005

(54) HYDRAULIC DRIVE SYSTEM

(75) Inventors: Masao Shinoda, Kanagawa (JP);
Shimpei Miyakawa, Kanagawa (JP);
Chishiro Yamashina, Kanagawa (JP);
Tamami Takahashi, Tokyo (JP);
Yoshihiro Mochizuki, Kanagawa (JP);
Shinzo Mammoto, Tokyo (JP); Shiro Kumazawa, Tokyo (JP); Ryuji Kodama, Tokyo (JP)

(73) Assignee: Ebara Corporation, Tokyo (JP)

( * ) Notice: Subject to any disclaimer, the term of this patent is extended or adjusted under 35 U.S.C. 154(b) by 114 days.

(21) Appl. No.: 10/467,803

(22) PCT Filed: Feb. 13, 2001

(86) PCT No.: PCT/JP02/01188

§ 371 (c)(1),
(2), (4) Date: Aug. 12, 2003

(87) PCT Pub. No.: WO02/064982

PCT Pub. Date: Aug. 22, 2002

(65) Prior Publication Data

US 2004/0069371 A1 Apr. 15, 2004

(30) Foreign Application Priority Data

Feb. 13, 2001 (JP) ........................................ 2001-035321

(51) Int. Cl.$^7$ ................................................. B65B 1/04
(52) U.S. Cl. ........................... 141/286; 141/45; 141/82; 141/85; 141/290; 134/169 C
(58) Field of Search ................................. 141/45, 52–54, 141/56, 59, 82, 85, 91, 93, 286, 290; 134/168 C, 169 C

(56) References Cited

U.S. PATENT DOCUMENTS 5,348,058 A * 9/1994 Ruhl .............................. 141/1

5,487,907 A * 1/1996 Drown et al. ................ 426/417

FOREIGN PATENT DOCUMENTS

| JP | 9-294987 | 11/1997 |
| JP | 2000-344477 | 12/2000 |

OTHER PUBLICATIONS

Microfilm of the specification and drawings annexed to the written application of Japanese Utility Model Application No. 156463/1985 (Laid–open No. 66001/1987) (Kabushiki Kaisha Komatsu Seisakusho), Apr. 24, 1987.

Microfilm of the specification and drawings annexed to the written application of Japanese Utility Model Application No. 39100/1998 (Laid–open No. 141901/1989), (Kabushiki Kaisha Nihgata Tekkosho), Sep. 28, 1989.

Koskinen K.T. and Vilenius M.J., Himpei Miyakawa (Translation), entitled *"Water Hydraulics–A Versatile Technology"*, Nippon Yuatsu Gakkai Ronbunshu, vol. 29, No. 7. 1998, pp. 597–603.

* cited by examiner

Primary Examiner—Steven O. Douglas
(74) Attorney, Agent, or Firm—Wenderoth, Lind & Ponack, L.L.P.

(57) ABSTRACT

A hydraulic drive system that does not cause a decrease in efficiency of actuators, does not hinder an optimal action of devices such as flow adjustment valves, and does not cause any corrosion of water acting as an operating fluid. The system uses water as an operating fluid. The system includes a hydraulic generation apparatus 40 including, a main tank 41, a return path 52, an accessory tank 54, and a water disposal apparatus 56 disposed in a path 57. The operating fluid from structuring devices of the processing apparatuses 10, 20 and 30 flows through the return path 52. The operating fluid flows from the accessory tank 54 to the main tank 41 through the path 57 and the water disposal apparatus 56.

8 Claims, 2 Drawing Sheets

HYDRAULIC DRIVE SYSTEM

FIELD OF THE INVENTION

The present invention relates to a hydraulic drive system using water such as tap water or the like as an operating fluid. More particularly, the present invention relates to a hydraulic drive system suitable for feeding water as an operating fluid to a processing apparatus of a hydraulic drive type and to a drive system for driving the processing apparatus.

RELATED ARTS

FIG. 1 is a diagram showing a configuration of a conventional-type hydraulic drive system and, in particular, showing an example in which the hydraulic drive system is applied to a food processing apparatus. The food processing apparatus of a hydraulic drive type shown therein comprises a plurality (three in this drawing) of processing apparatuses 10, 20 and 30, each for processing food, and a hydraulic generation apparatus 40 for feeding high pressure water for driving the processing apparatuses 10, 20 and 30.

The processing apparatus 10 is provided with hydraulic motors 11 and 11, two-way directional control valves 12 and 12 as well as flow adjustment valves 13 and 13. The processing apparatus 20 is provided with hydraulic cylinders 21 and 21, a directional control valve 22 and check valve-mounted flow adjustment valves 23, 23, 23 and 23. Further, the processing apparatus 30 is provided with a hydraulic cylinder 31, a hydraulic motor 32, a hydraulic servo valve 33, a two-way directional control valve 34 and a flow adjustment valve 35. The high-pressure water generated by the hydraulic generation apparatus 40 is fed to each of the processing apparatuses 10, 20 and 30 through a feed path 51, and return water from the processing apparatuses 10, 20 and 30 is fed to the main tank 41 of the hydraulic generation apparatus 40 through a return path 52. The water pressure (back pressure) of the return water of the processing apparatuses 10, 20 and 30 may be measured with pressure gauges Pt1, Pt2 and Pt3, respectively.

A number of hydraulic drive systems of this kind are each typically arranged, as shown in FIG. 1, so as for one hydraulic generation apparatus 40 to drive a plurality of the processing apparatuses 10, 20 and 30. In these systems, the hydraulic generation apparatus 40 is often disposed in the position remote from each of the processing apparatuses 10, 20 and 30 so that water may have to be circulated between the processing apparatuses 10, 20 and 30 as well as the hydraulic generation apparatus 40 through the feed path 51 and the return path 52, each composed of a long hose.

If the distance L between each of the processing apparatuses 10, 20 and 30 and the hydraulic generation apparatus 40 would become long, resistance (back pressure) within the return path 52 for returning water from each of the processing apparatuses 10, 20 and 30 to the hydraulic generation apparatus 40 may become so great that an efficiency of an actuator such as the hydraulic cylinders 21 and 31 as well as the hydraulic motors 11 and 32, each constituting each of the processing apparatuses 10, 20 and 30, may be decreased and that the optimal actions of the devices including the flow adjustment valves 13 and 35 as well as the check valve-mounted flow adjustment valve 23 may be damaged. Examples that may adversely affect the action of the device may include an example in which the elongation of the return path 52 elevates the pressure of the return port and consequently reduces responsiveness of the hydraulic servo valve 33 or decreases the static bearing effects, thereby hindering the behavior and performance of the hydraulic servo valve 33.

Further, for the hydraulic motors 11 and 32, the inner pressure of the shaft seal is caused to rise as the pressure of the return port becomes high, thereby leading to the shortening of the life of the shaft seal. Moreover, in the actual system, the distance between the hydraulic generation apparatus 40 and each of the processing apparatuses 10, 20 and 30 is not necessarily identical to each other, so that the performance of each apparatus may be caused to differ from each other if the processing apparatuses 10, 20 and 30 are driven.

In addition to the above problems, the use of water as an operating fluid may cause the problem in which water in the main tank 41 of the hydraulic generation apparatus 40 is caused to corrode. Water may corrode in a pipe of the feed path 51 and the return path 52 between the hydraulic generation apparatus 40 and the processing apparatuses 10, 20 and 30, if water is not circulated for a long period of time. For example, for a food processing machine that puts an importance particularly upon safety and public hygiene, processed products have to be discarded if a corrosive water as an operating fluid would leak outside and such water would be attached to the food in the process of processing.

SUMMARY OF THE INVENTION

With the above situation taken into account, the present invention has been completed with the object to provide a hydraulic drive system that does not reduce efficiency of an actuator such as a hydraulic cylinder, a hydraulic motor, and so on, each constituting a processing apparatus, and that does not hinder the optimal actions of the devices such as flow adjustment valves and so on, due to an elongation of the distance between the processing apparatus and the hydraulic generation apparatus and a consequential increase in resistance (back pressure) in the return path.

Further, the present invention has another object to provide a hydraulic drive system suitable as a system for driving a food processing apparatus that causes corroding water to be used as an operating fluid and puts the greatest importance particularly upon safety and public hygiene.

In order to achieve the objects, the present invention provides a hydraulic drive system using water as an operating fluid, comprising a processing apparatus for processing an object and a hydraulic generation apparatus for generating a high-pressure water for driving the processing apparatus, wherein the hydraulic generation apparatus is provided with a main tank, an accessory tank is provided in a return path through which the operating fluid flows from a processing apparatus-structuring device at the side of the processing apparatus, and a water disposal apparatus is provided in a path through which the operating fluid flows from the accessory tank to the main tank.

By locating the accessory tank in the return path through which the operating fluid flows from the device structuring the processing apparatus in the manner as described above, the pressure in the return path of the structuring device can be sustained at a low level even if the distance between the processing apparatus and the hydraulic generation apparatus would become elongated. Therefore, a decrease in an efficiency of the actuator such as the hydraulic cylinders, the hydraulic motors and so on, as the devices structuring the processing apparatus, can be prevented. Further, there can be prevented an occurrence of the hindrance of the optimal action of the devices such as the flow adjustment valves and so on, including, for example, a decrease in responsiveness of the hydraulic servo valve, a decrease in the static bearing effects, a decrease in the behavior and performance of the hydraulic servo valve, a shortening of the life of the shaft seal of the hydraulic motor, and an occurrence of different performance among the plural processing apparatuses.

Moreover, the water disposal apparatus is disposed in the path through which the operating fluid flows from the accessory tank to the main tank, so that water as the operating fluid from the processing apparatus can be processed with the water disposal apparatus, thereby sustaining the water as the operating fluid in a state suitable for the drive system.

The present invention is characterized in that the water disposal apparatus of the hydraulic drive system as described in claim 1 is further provided with one or both of a cleaning processing function for cleaning the operating fluid and a sterilizing function for killing microorganisms in the operating fluid.

As the water disposal apparatus is provided with one or both of the cleaning processing function for cleaning the operating fluid and the sterilizing function for sterilizing microorganisms in the operating fluid, the water acting as the operating fluid from the processing apparatus can be sustained in a clean state or in a germ-free state or a clean and germ-free state. Therefore, the present invention can provide a hydraulic drive system suitable as a drive system for a food processing apparatus that puts the most importance on safety and sanitation in the manner as described above.

The hydraulic drive system according to the present invention comprises a high-pressure liquid generating apparatus (40), a main tank (41) communicating with a liquid inlet of the high-pressure liquid generating apparatus, an accessory tank (54) with an side exposed to ambient atmosphere, a liquid processing apparatus (56), a high-pressure liquid feed path (51) communicating a high-pressure liquid outlet of the high-pressure liquid generating apparatus with a high-pressure liquid inlet of the processing apparatus, a first return path (52) communicating a liquid outlet of the processing apparatus with the accessory tank, a second return path (53) communicating the accessory tank with the liquid processing apparatus, and a third return path (57) communicating the liquid processing apparatus with the main tank.

The liquid processing apparatus is provided with one or both of a function of cleaning a liquid and a sterilizing function for sterilizing microorganisms in the liquid. The liquid is water. The processing apparatus is for processing food, and the second return path (53) is provided with a pump (55) for transferring the liquid of the accessory tank to the liquid processing apparatus.

The food processing plant of the present invention comprises a food processing apparatus (10, 20, 30) drivable with a high-pressure liquid, a high-pressure liquid generating apparatus (40), a main tank (41) communicating with a liquid inlet of the high-pressure liquid generating apparatus, an accessory tank (54) with an side exposed to ambient atmosphere, a liquid processing apparatus (56), a high-pressure liquid feed path (51) communicating a high-pressure liquid outlet of the high-pressure liquid generating apparatus with a high-pressure liquid inlet of the food processing apparatus, a first return path (52) communicating a liquid outlet of the processing apparatus with the accessory tank, a second return path (53) communicating the accessory tank with the liquid processing apparatus, and a third return path (57) communicating the liquid processing apparatus with the main tank.

The liquid processing apparatus of the food processing plant is provided with one or both of a function of cleaning a liquid and a sterilizing function for sterilizing microorganisms in the liquid. The liquid is water and the second return path (53) is provided with a pump (55) for transferring the liquid of the accessory tank to the liquid processing apparatus.

Figure 1:
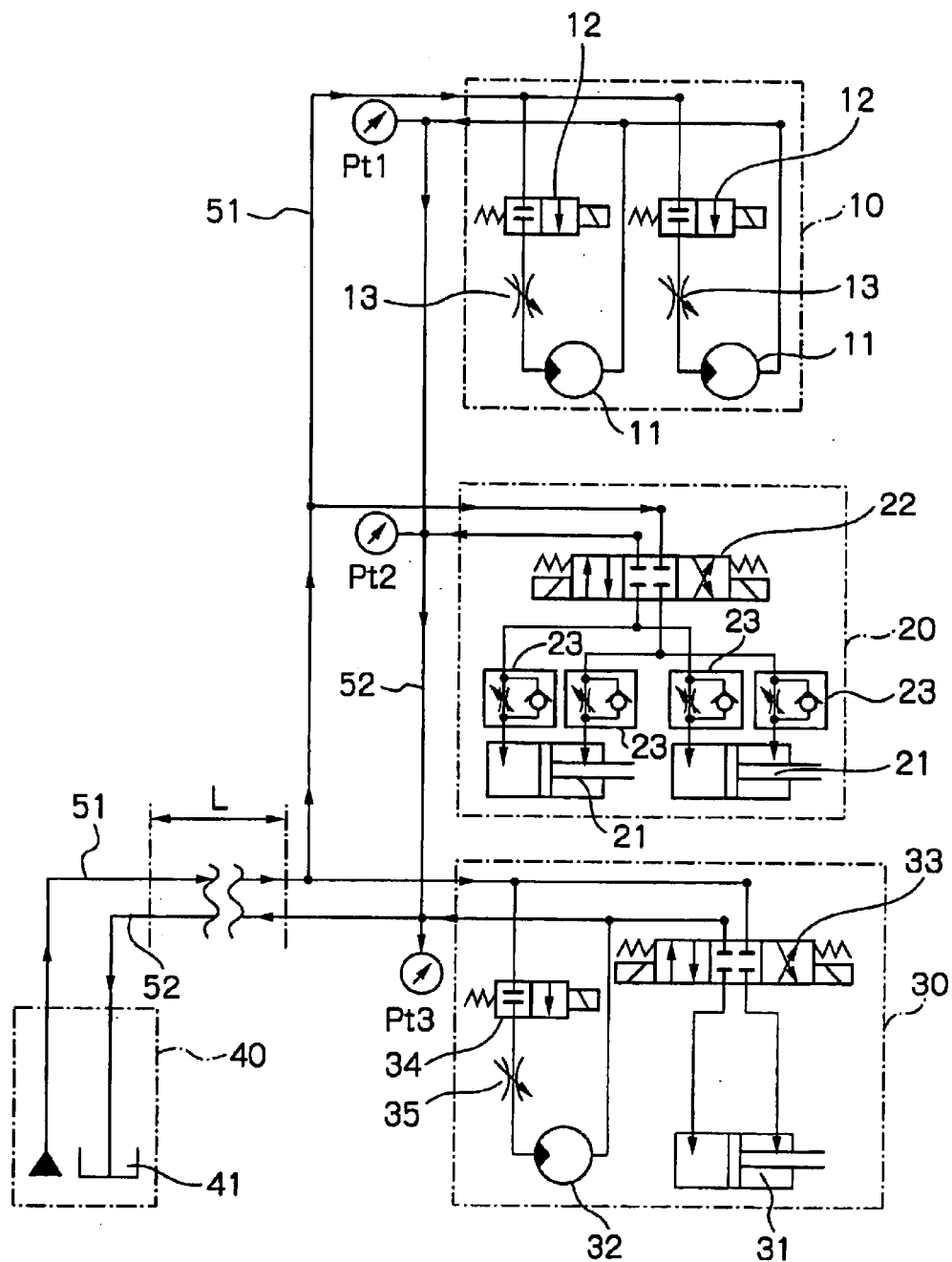
FIG. 1 is a diagram showing an example of the configuration of a hydraulic drive system of a conventional type.

In the drawings, reference numerals denote the following:

10: Processing apparatus
20: Processing apparatus
30: Processing apparatus
40: Hydraulic generation apparatus
41: Main tank
51: Feed path
52, 53: Return path
54: Accessory tank
55: Forced feed pump
56: Water disposal apparatus
57: Path

DETAILED DESCRIPTION OF THE PREFERRED EMBODIMENT

Figure 2:
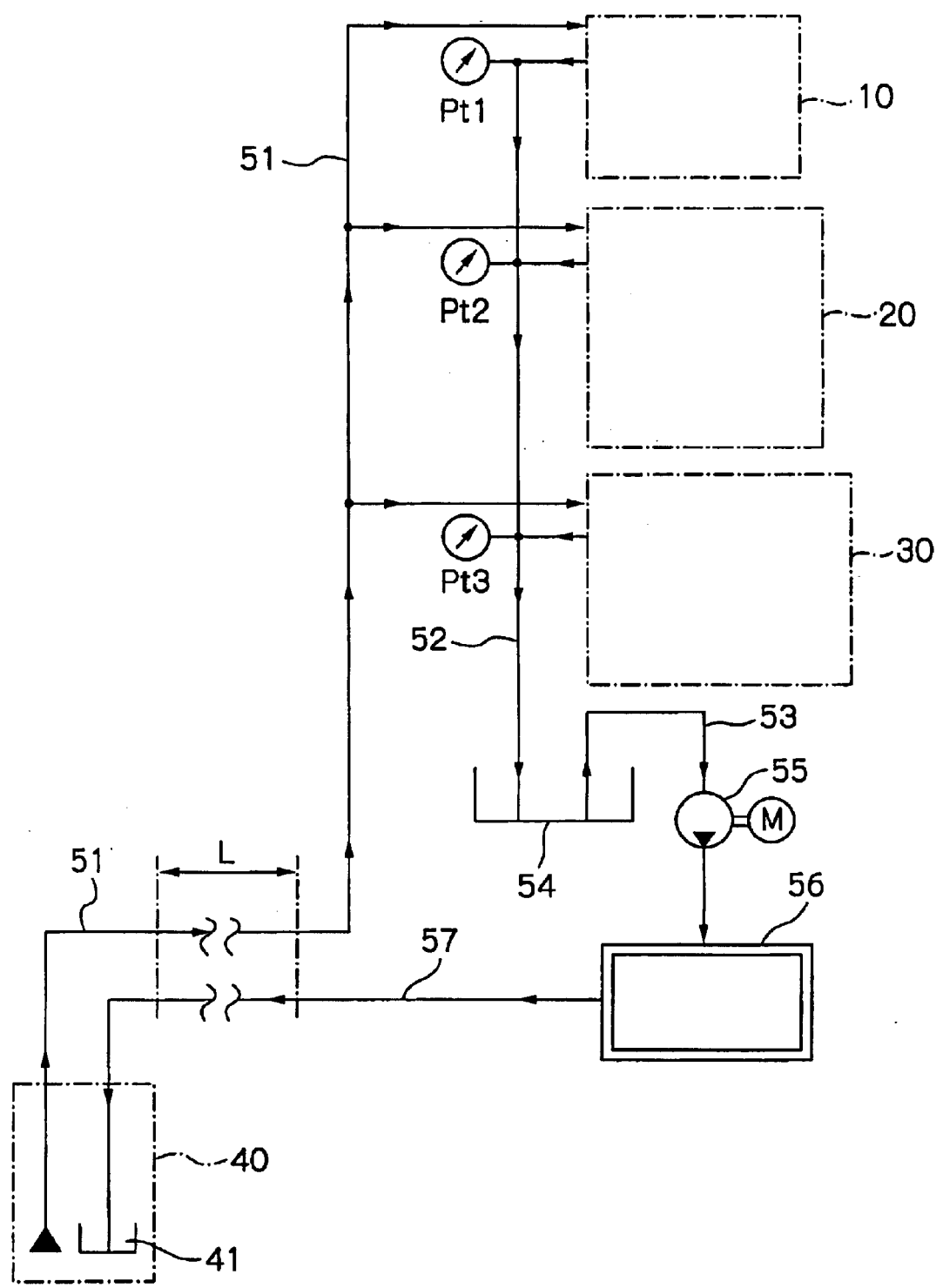
FIG. 2 is a diagram showing an example of the configuration of a hydraulic drive system according to the present invention.

Now, a description will be made regarding modes for carrying out the invention with reference to the accompanying drawings. FIG. 2 is a diagram showing an example of the configuration of the hydraulic drive system according to the present invention. As shown in FIG. 2, a hydraulic generation apparatus 40 is provided with a main tank 41. An accessory tank 54 is disposed between a return path 52 and a return path 53. A water disposal apparatus 56 is disposed in a path 57 through which water acting as an operating fluid flows from the accessory tank 54 to the main tank 41.

The above configuration of the processing apparatuses 10, 20 and 30 may be identical to or different from the configuration of the processing apparatuses 10, 20 and 30 as illustrated in FIG. 1. Further, FIG. 2 illustrates an example in which three of the processing apparatuses are used; however, it should be noted herein that the number of the processing apparatuses is not restricted to this particular one and that the number of the processing apparatuses can be more than three or less than three.

By locating the accessory tank 54 in the return path 52 at the side of the processing apparatuses 10, 20 and 30 in the manner as described above, the accessory tank 54 can be disposed so as to be exposed to ambient atmosphere, so that the pressure of the hydraulic devices such as the actuators, the flow adjustment valves and so on of the processing apparatuses 10, 20 and 30 in the return path 52 can be sustained at a low level. Therefore, the actuators such as the cylinders, hydraulic motors and so on can be driven under conditions that do not reduce its durability, and the various devices such as the hydraulic servo valves and so on can be operated in an optimal state.

Further, the path 57 ranging from the accessory tank 54 to the main tank 41 is provided with a forced feed pump 55 for feeding water in the accessory tank 54 to the main tank 41 of the hydraulic generation apparatus 40 in a pressurized way and further with the water disposal apparatus 56. Therefore, a degree of cleanliness of the water can be maintained as the operating fluid. Moreover, as the water disposal apparatus 56 can also be configured as a sterilizing apparatus, microorganisms in the operating fluid can also be sterilized, thereby providing a hydraulic drive system of a hygienic type, which uses water as an operating fluid. The sterilizing apparatus may include, for example, an ultraviolet sterilizing apparatus.

Moreover, the sterilizing apparatus may generally vary its sterilizing effects with a flow rate or a processing time of a liquid to be treated, which flows through the sterilizing apparatus. The provision of the sterilizing apparatus in the path 57 between the accessory tank 54 and the main tank 41 allows various combinations of the flow rates with the processing durations of time, thereby enabling the easy selection of the sterilizing apparatus. Specifically, the return path 52 from each of the processing apparatuses 10, 20 and 30 to the hydraulic generation apparatus 40 can be provided with the sterilizing apparatus. For example, one sterilizing apparatus can be disposed for two of the processing apparatuses. A variation in the combinations of the sterilizing apparatuses with the processing apparatuses allows an easy management of the flow rate and the duration of time of the passing water in order to achieve the optimal sterilization effects of the sterilizing apparatuses.

In addition, the pressure from the accessory tank 54 to the main tank 41 imposes no adverse influence upon the performance of the hydraulic drive system, so that a water disposal apparatus having a relatively large resistance can also be used. For example, there may be used the water disposal apparatus of a hollow fiber filter type, active carbon filter type, and so on. They can be arranged in a series in the path 57.

In the above example, a separate description has been made regarding the water disposal apparatus having the cleaning function for cleaning water as the operating fluid and the sterilizing apparatus having the sterilizing function for killing microorganisms in the water. It is to be noted herein, however, that one apparatus can also be used which has both the cleaning function and the sterilizing function. As a matter of course, the water disposal apparatus can also be combined with the sterilizing apparatus into one water disposal apparatus having both of the cleaning function and the sterilizing function as a whole.

The present invention according to the examples as described above enables the configuration of a hydraulic drive system using water such as tap water or the like as an operating fluid, which has a high level of safety and sanitation as well as can prevent a decrease in the performance of system-structuring devices.

EFFECTS OF THE INVENTION

As described above, the invention as described in each of the claims can offer the remarkable effects as will be described hereinafter.

In accordance with the invention, the arrangement of the accessory tank in the return path of the devices structuring the processing apparatuses through which the operating fluid flows from the processing apparatus-structuring devices can sustain the pressure in the return path at a low level, even if the distance between the processing apparatus or apparatuses and the hydraulic generation apparatus would become longer. Therefore, a decrease in efficiency of the actuators, such as the hydraulic cylinders, the hydraulic motors and so on, structuring the processing apparatus can be prevented, and a decrease in the static bearing effects can also be prevented. Moreover, a decrease in the behavior and performance of the hydraulic servo valve can be prevented. In addition, the lowering of the life of the shaft seal of the hydraulic motor can be prevented, and an occurrence of a difference in the performance among the plural processing apparatuses can also be prevented.

Further, the path for the operating fluid flowing from the accessory tank to the main tank is provided with the water disposal apparatus, so that the water from the processing apparatus acting as the operating fluid can be treated with the water disposal apparatus. Therefore, the water as the operating fluid can be sustained in a state suitable for use with a drive system.

In accordance with the invention, the water disposal apparatus is provided with one or both of the cleaning function for cleaning the operating fluid and the sterilizing function for sterilizing microorganisms in the operating fluid. Therefore, the water from the processing apparatus acting as the operating fluid can be maintained in a clean state or in a germ-free state or in a clean and germ-free state, thereby providing a hydraulic drive system suitable particularly for a food processing apparatus that has to put the most importance upon safety and public hygiene.

What is claimed is:

1. A hydraulic drive system for driving a processing apparatus (10, 20, 30), comprising a high-pressure liquid generating apparatus (40), a main tank (41) communicating with a liquid inlet of the high-pressure liquid generating apparatus, an accessory tank (54) with a side exposed to ambient atmosphere, a liquid processing apparatus (56), a high-pressure liquid feed path (51) through which a high-pressure liquid outlet of the high-pressure liquid generating apparatus is communicated with a high-pressure liquid inlet of the processing apparatus, a first return path (52) through which a liquid outlet of the processing apparatus is communicated with the accessory tank, a second return path (53) through which the accessory tank is communicated with the liquid processing apparatus, a third return path (57) through which the liquid processing apparatus is communicated with the main tank, and a pump (55) for returning the liquid in the accessory tank (54) to the main tank (41) through the liquid processing apparatus (56).

2. The hydraulic drive system according to claim 1, wherein the liquid processing apparatus is provided with one or both of a function of cleaning a liquid and a sterilizing function for sterilizing microorganisms in the liquid.

3. The hydraulic drive system according to claim 1, wherein the liquid is water, the processing apparatus is for processing food.

4. A food processing plant comprising a food processing apparatus (10, 20, 30) drivable with a high-pressure liquid, a high-pressure liquid generating apparatus (40), a main tank (41) communicating with a liquid inlet of the high-pressure liquid generating apparatus, an accessory tank (54) with a side exposed to ambient atmosphere, a liquid processing apparatus (56), a high-pressure liquid feed path (51) through which a high-pressure liquid outlet of the high-pressure liquid generating apparatus is communicated with a high-pressure liquid inlet of the food processing apparatus, a first return path (52) through which a liquid outlet of the processing apparatus is communicated with the accessory tank, a second return path (53) through which the accessory tank is communicated with the liquid processing apparatus, a third return path (57) through which the liquid processing apparatus is communicated with the main tank, and a pump (55) for returning the liquid in the accessory tank (54) to the main tank (41) through the liquid processing apparatus (56).

5. The food processing plant according to claim 4, wherein the liquid processing apparatus is provided with one or both of a function of cleaning a liquid and a sterilizing function for sterilizing microorganisms in the liquid.

6. The food processing plant according to claim 4, wherein the liquid is water.

7. The hydraulic drive system according to claim 2, wherein the liquid is water, the processing apparatus is for processing food.

8. The food processing plant according to claim 5, wherein the liquid is water.

* * * * *

UNITED STATES PATENT AND TRADEMARK OFFICE
CERTIFICATE OF CORRECTION

PATENT NO. : 6,889,730 B2  
DATED : May 10, 2005  
INVENTOR(S) : Masao Shinoda et al.

It is certified that error appears in the above-identified patent and that said Letters Patent is hereby corrected as shown below:

<u>Title page,</u>  
Item [22], PCT Filed, change "Feb. 13, 2001" to -- Feb. 13, 2002 --.

Signed and Sealed this

Second Day of May, 2006

JON W. DUDAS  
*Director of the United States Patent and Trademark Office*